US008665209B2

(12) United States Patent
Rimas-Ribikauskas et al.

(10) Patent No.: US 8,665,209 B2
(45) Date of Patent: *Mar. 4, 2014

(54) PRESSURE BASED SELECTION

(75) Inventors: Emily K. Rimas-Ribikauskas, Seattle, WA (US); Robert James Jarrett, Snohomishi, WA (US); David Leininger Adolphson Anson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/710,670

(22) Filed: Feb. 23, 2010

(65) Prior Publication Data

US 2010/0153879 A1 Jun. 17, 2010

Related U.S. Application Data

(63) Continuation of application No. 11/017,040, filed on Dec. 21, 2004, now Pat. No. 7,683,889.

(51) Int. Cl.
G09G 5/08 (2006.01)
(52) U.S. Cl.
USPC ........... 345/156; 345/157; 345/173; 455/566; 455/575; 178/18.01; 178/19.01
(58) Field of Classification Search
USPC .......... 345/156, 157, 173–179; 455/566, 575, 455/556.1, 556.2; 178/18.01–19.06
See application file for complete search history.

(56) References Cited

U.S. PATENT DOCUMENTS

| 4,918,262 | A | * | 4/1990 | Flowers et al. ............... 345/173 |
| 5,184,120 | A | * | 2/1993 | Schultz ................... 340/870.38 |
| 5,936,614 | A | | 8/1999 | An et al. |
| 5,995,106 | A | | 11/1999 | Naughton et al. |
| 6,392,638 | B2 | * | 5/2002 | Hanajima et al. ............. 345/173 |
| 6,636,203 | B1 | | 10/2003 | Wong et al. |
| 6,803,929 | B2 | * | 10/2004 | Hinegardner et al. ........ 715/769 |
| 7,683,889 | B2 | * | 3/2010 | Rimas Ribikauskas et al. ............................. 345/173 |
| 2001/0024195 | A1 | | 9/2001 | Hayakawa |
| 2002/0084977 | A1 | * | 7/2002 | Nakamura .................... 345/156 |
| 2002/0180763 | A1 | | 12/2002 | Kung |
| 2003/0193484 | A1 | | 10/2003 | Lui et al. |
| 2005/0110769 | A1 | | 5/2005 | DaCosta et al. |

FOREIGN PATENT DOCUMENTS

JP 2004-280532 * 7/2004
JP 20040287640 A 10/2004

OTHER PUBLICATIONS

European Search Report, EP37744TE900aha, 05112245.5-1245/1674977, Mailed: Apr. 12, 2012.
"Pressure-Sensitive Icons" IBM Technical Disclosure Bulletin, International Business Machines Corp. (Thornwood), US, dated Jun. 1, 1990.

(Continued)

Primary Examiner — Jennifer Nguyen
(74) Attorney, Agent, or Firm — Shook, Hardy & Bacon L.L.P.

(57) ABSTRACT

The use of pressure-sensitive selection tools in a graphical user interface is disclosed in which the amount of pressure during a selection operation may modify selection behavior. Upon receiving a selection input, the pressure applied is determined and the selection behavior modified. In some embodiments, the number of objects selected is increased when more pressure is applied and decreased when less pressure is applied.

19 Claims, 17 Drawing Sheets

(56) References Cited

OTHER PUBLICATIONS

NonFinal Office Action, mailed Nov. 17, 2011, U.S. Appl. No. 12/619,208, 8 pages.
Notice of Allowance mailed Mar. 1, 2012, U.S. Appl. No. 12/619,208, 5 pages.
"Heslop B et al: ""Illustrating Your Documents with Graphics""", Jan. 1, 2003, Microsoft Office Word 2003 Bible, Wiley Publishing, US, pp. 437-464, XP007921636."
NonFinal Office Action, U.S. Appl. No. 13/539,687, mailed Nov. 13, 2012, 6 pages.
Non-Final Office Action mailed Jul. 11, 2013 re U.S. Appl. No. 12/619,373, 14 pgs.

* cited by examiner

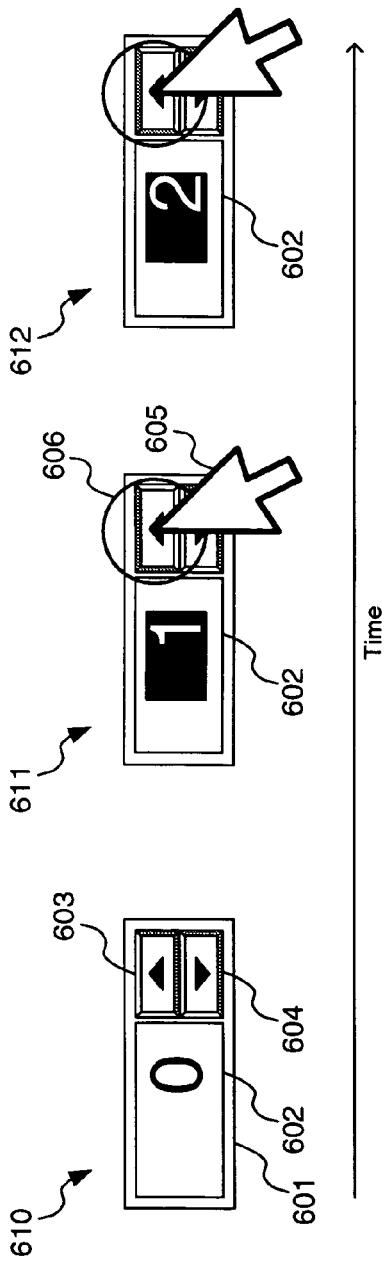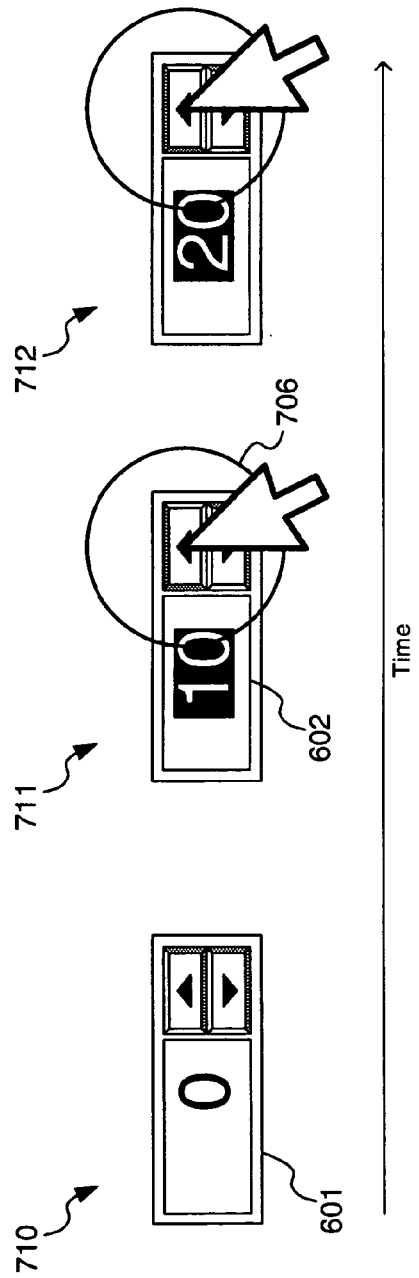

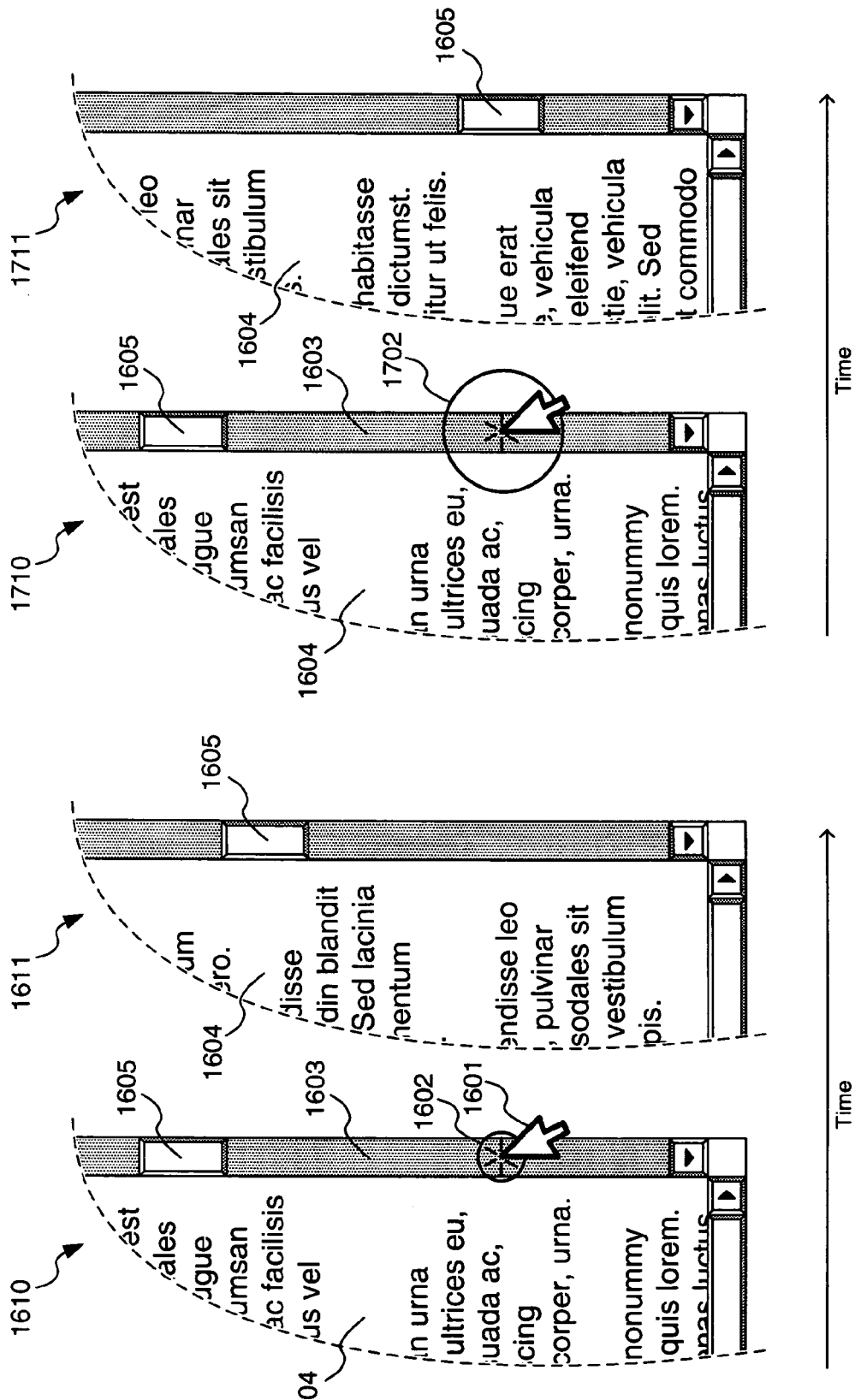

PRESSURE BASED SELECTION

RELATED APPLICATIONS

This application is a continuation of and claims benefit of priority to U.S. patent application Ser. No. 11/017,040, filed on Dec. 21, 2004, which application is herein incorporated by reference.

FIELD OF THE INVENTION

This invention relates generally to managing input to computers. More particularly, the invention allows for acting on a user's input in accordance with the physical pressure exerted by the user when providing the input.

BACKGROUND OF THE INVENTION

In the field of computing, stylus-based input is growing more prevalent with the increasingly widespread use of computing devices such as personal digital assistants (PDAs), tablet computers, laptop computers, and the like. The input devices used to detect contact and position by a stylus shall hereinafter be referred to as digitizers. A digitizer may be attached to or otherwise integrated with the display surface of a display device. The display device may further be separate from or integral with a computing device. For example, a tablet computer typically has an integral display device with a digitizer. Alternatively, a digitizer may take the form of an external peripheral such as a digitizing tablet. Some types of digitizers are able to translate a stylus contact with the digitizer into a two-dimensional position that corresponds to coordinates on the display surface closest to where the tip of the stylus came into contact.

Along with position, digitizers are able to detect the amount of pressure exerted by the user when making contact with a stylus. This information may be passed to the computing device in the form of a magnitude, perhaps as an eight-bit number. Typically, however, most operating systems, applications, and other software ignore this information, primarily interpreting contact pressure as a single click, regardless of magnitude. Notable exceptions include Adobe's Photoshop® and similar graphics programs, which use pressure on a digitizer tablet to simulate the varying strokes of a virtual paint brush.

It would be an enhancement for graphical interface users to take full advantage of pressure as an input throughout an operating system, applications, and/or other software. It would also be an enhancement for graphical interface users to develop faster and more accurate control of interface functions using existing hardware. Further, it would be an enhancement for graphical interface users to achieve additional intuitive functionality from existing input devices without confusing users with additional buttons or switches.

SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

A first embodiment of the invention provides a computer-implemented method for adjusting a displayed control. An input from a digitizer, pressure sensitive mouse, etc. is received at a location corresponding to the displayed control. The amount of pressure applied by the user is determined, and the displayed control is adjusted depending on the amount of pressure applied.

A second embodiment of the invention provides a computer-implemented method for responding to a user interaction. A tap is received upon a display device, and it is determined whether the tap was a hard tap. If a hard tap, one function is performed, but if not, a separate function is performed.

A third embodiment of the invention provides a computer-implemented method for performing a function responding to a tap. The tap is received and location, pressure, and length of time of the tap are analyzed to determine if the tap is a hard tap. If the pressure exceeds a certain threshold within a certain amount of time, the tap is found to be a hard tap, and a particular function is performed. Failing the test, a different function is performed.

A fourth embodiment of the invention provides a computer-implemented method for interacting with displayed objects. When receiving a selection of objects via pressure enhanced input, the amount of pressure plays a role in determining the quantity/type/etc. of objects to be selected.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 illustrates incrementing a spinner control in a manner provided by an illustrative embodiment of the invention.

FIG. 7 illustrates incrementing a spinner control in a manner provided by an illustrative embodiment of the invention.

FIG. 16 illustrates movement of a scrollbar provided by an illustrative embodiment of the invention.

FIG. 17 illustrates movement of a scrollbar provided by an illustrative embodiment of the invention.

DETAILED DESCRIPTION OF ILLUSTRATIVE EMBODIMENTS

In the following description of various illustrative embodiments, reference is made to the accompanying drawings, which form a part hereof, and in which are shown by way of illustration various embodiments in which the invention may be practiced. It is to be understood that other embodiments may be utilized, and structural and functional modifications may be made, without departing from the scope and spirit of the present invention.

Illustrative Operating Environment

Figure 1:
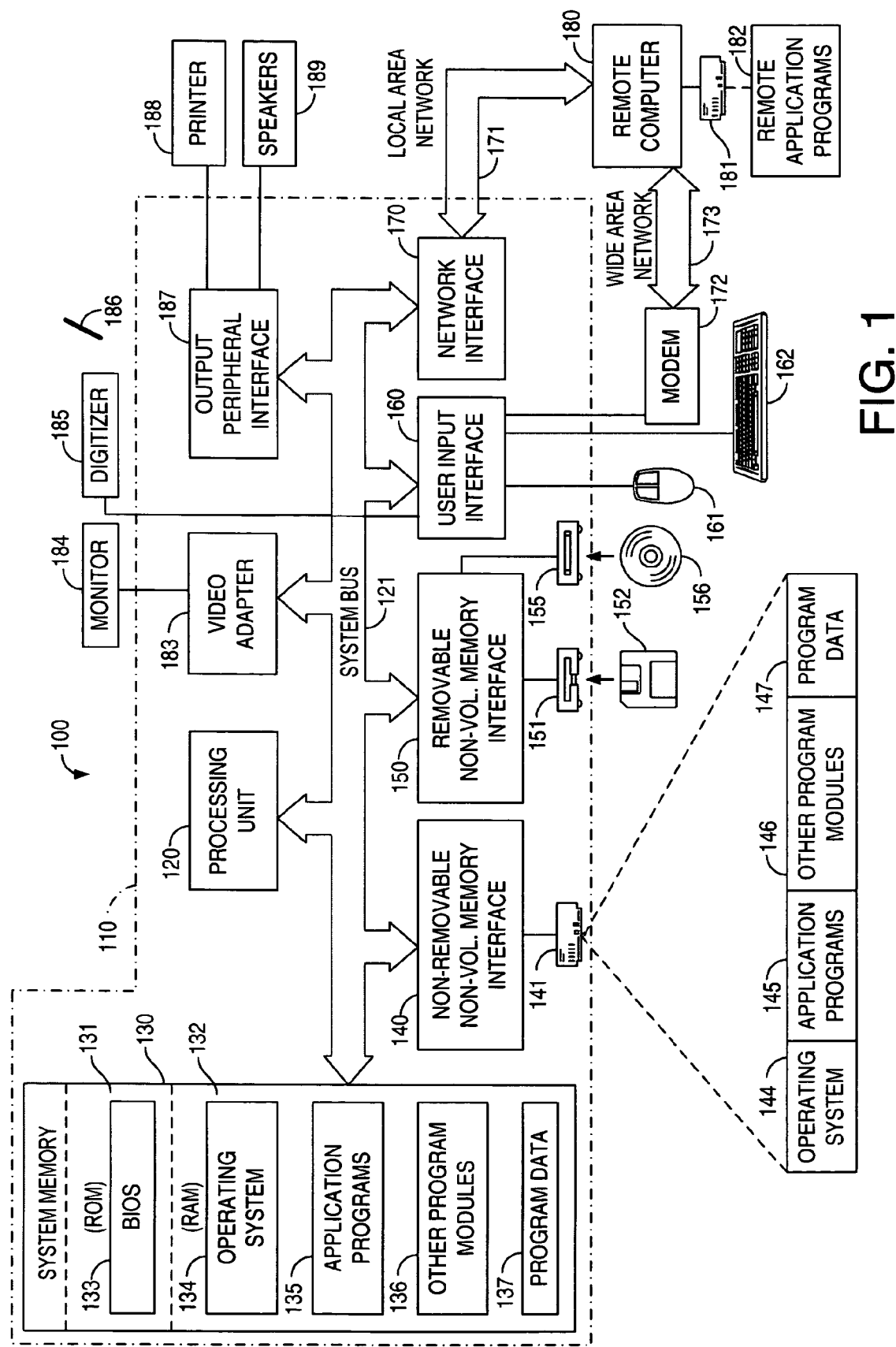
FIG. 1 an operating environment that may be used for one or more aspects of an illustrative embodiment of the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should computing environment 100 be interpreted as having any dependency or requirement relating to any one or combination of components illustrated in illustrative operating environment 100.

The invention is operational with numerous other general purpose or special purpose computing system environments or configurations. Examples of well known computing systems, environments, and/or configurations that may be suitable for use with the invention include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, illustrative computing system environment 100 includes a general purpose computing device in the form of a computer 110. Components of computer 110 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 110 typically includes a variety of computer readable media. Computer readable media can be any available media that can be accessed by computer 110 such as volatile, nonvolatile, removable, and non-removable media. By way of example, and not limitation, computer readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) such as BLUETOOTH standard wireless links, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates software including operating system 134, application programs 135, other program modules 136, and program data 137.

Computer 110 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules and other data for computer 110. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are given different numbers in FIG. 1 to illustrate that, at a minimum, they are different copies. A user may enter commands and information into computer 110 through input devices such as a keyboard 162 and pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 184 or other type of display device is also coupled to the system bus 121 via an interface, such as a video adapter 183. Video adapter 183 may comprise advanced 2D or 3D graphics capabilities, in addition to its own specialized processor and memory.

Computer 110 may also include a digitizer 185 to allow a user to provide input using a stylus 186. Digitizer 185 may either be integrated into monitor 184 or another display device, or be part of a separate device, such as a digitizer pad. Computer 110 may also include other peripheral output devices such as speakers 189 and a printer 188, which may be connected through an output peripheral interface 187.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is coupled to the LAN 171 through a network interface or adapter 170. When used in a WAN networking environment, computer 110 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 110, or portions thereof, may be stored remotely such as in remote storage device 181. By way of example, and not limitation, FIG. 1 illustrates remote application programs 182 as residing on memory device 181. It will be appreciated that the network connections shown are illustrative and other means of establishing a communications link between the computers may be used.

Pressure Sensitive Input

Figure 2:
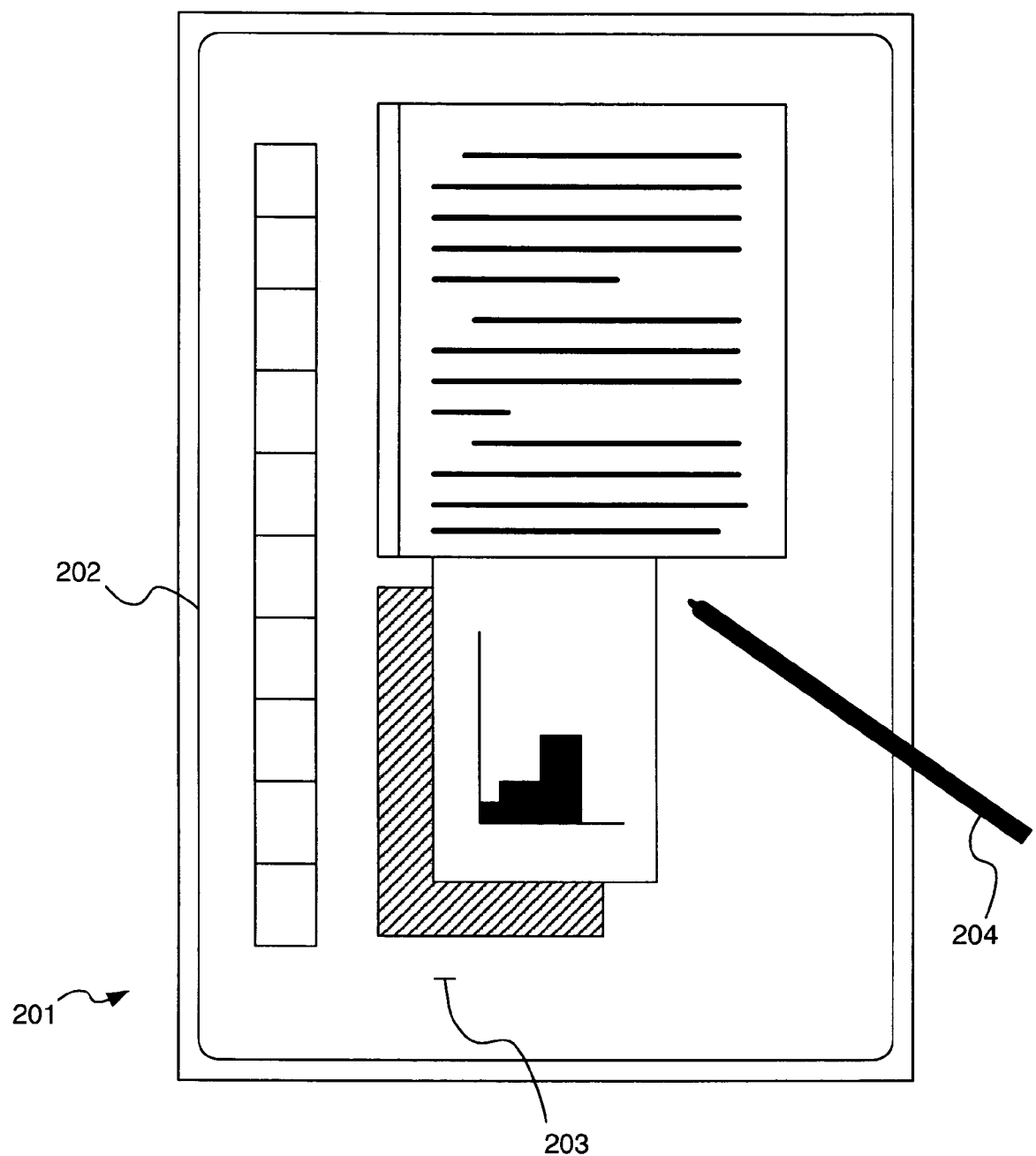
FIG. 2 is a plan view of a digitizer display of an illustrative computing device.

FIG. 2 illustrates a computing device that may be used with an embodiment of the invention. The computing device here is a tablet computer 201, which minimally includes a computer display 202 with an integral digitizer 203, and which may receive input via a user pressing a stylus 204 against the digitizer. Computer 110 may be embodied as tablet computer 201. Although tablet computers are used throughout this document as illustrative computing devices, tablet computers are only one among many possible computing devices that may be used to implement the invention. Alternative embodiments may comprise, by way of example, personal computers (PCs), laptop computers, handheld computer such as personal digital assistants (PDAs), cell phones, home electronic equipment, or any other computing device having or being coupled to an input device that detects input pressure, such as a digitizer or a pressure-sensitive pointing device such as a pressure-sensitive mouse, pressure-sensitive trackball, or pressure-sensitive joystick. The term "pressure-sensitive" is intended to refer to a pressure-sensitive input device that is capable of detecting (either directly or indirectly) and distinguishing between different amounts of applied input pressure, as opposed to merely being able to distinguish between input versus non-input.

Returning to FIG. 2, when stylus 204 comes in contact with the surface of the tablet computer's display 202, the digitizer 203 relays to computer 201 data representing both a two-dimensional location of the contact, as well as an amount of the pressure applied. The amount of pressure may be represented as a magnitude (e.g., a numeric value along a range of numeric values), a pressure category (e.g., light, medium, heavy, etc.), or in any other manner. Digitizer 203 may continuously update this information over time as stylus 204 moves around the display surface and as the contact pressure increases or decreases.

Stylus 204 may be any type of stylus, such as a man-made object or a human body part, such as a fingertip. A man-made stylus may include, but are not limited to, a passive- or active-type pen-like stylus such as is conventionally provided with many PDAs and tablet computers.

Figure 3:
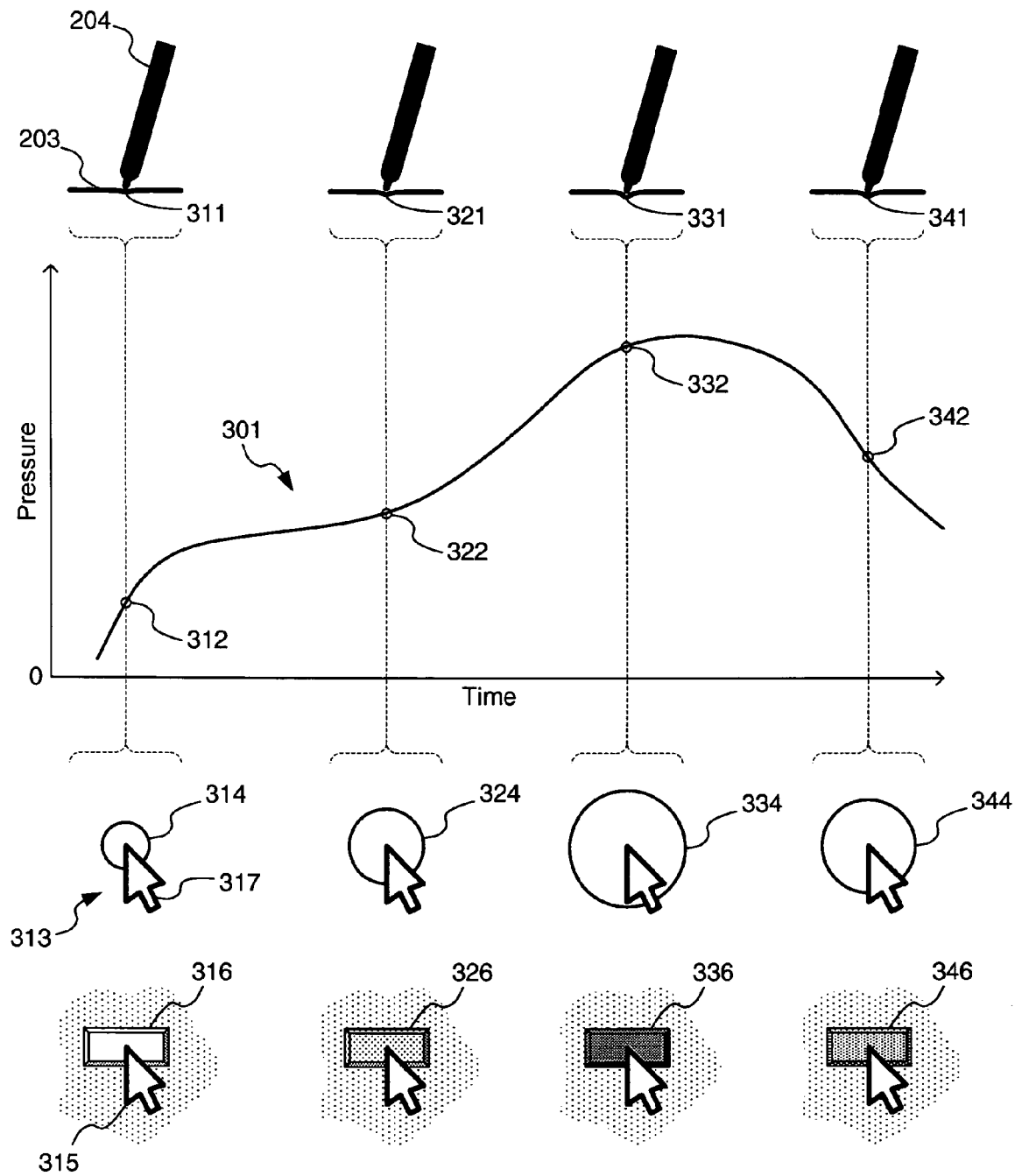
FIG. 3 depicts a graph of pressure over time and visual feedback provided by an illustrative embodiment of the invention.

An illustrative graph 301 of contact pressure over time is shown in FIG. 3, which also depicts two forms of visual feedback provided on the display 202 by illustrative embodiments of the invention. Here, stylus 204 is pressed against the surface of the display 202, and thus against the integrated digitizer 203 as well. In this example, the contact pressure from the stylus 204 is gradually increased and then decreased over time, as depicted in graph 301, which is typical of a tap of the stylus 204 against the digitizer 203. To give an impression of scale, the timeframe spanned by graph 301 may be just a fraction of a second, although the timeframe may be shorter or longer. The magnitude or other representation of the applied pressure may be sampled over time at various sample moments. For example, at a first moment in time, stylus 204 has just started pressing against digitizer 203 at point 311. The slight depression in the surface of digitizer 203 is detected as representative of the applied pressure, and the amount of pressure is shown as pressure magnitude 312 along graph 301. This value may be passed to the computer (not shown), which may modify its behavior depending on the pressure, and also may provide feedback to a user on the display. Pressure may be detected in any of a number of ways, such as by directly measuring the pressure or by estimating the pressure in accordance with other variables, such as the amount of surface area physically affected by the pressing of the tip of the stylus 204 against the digitizer 203.

Computer 110 may provide visual, tactile, and/or audible feedback to the user in accordance with the amount of pressure applied by the stylus 204. The pressure feedback provided by computer 110 may thus take many forms, any of which may alert the user to the level of pressure currently being exerted. For example, visual forms of feedback may involve modifying the shape, color, size, or transparency of a cursor or an underlying control presented on display 202. Alternatively, visual feedback may take the form of a pressure gauge, which may be depicted at a fixed location on display 202. Audible forms of feedback may involve producing a series of clicks or varying the pitch of a sound in conjunction with the changing pressure. Tactile forms of feedback may include one or more intensities or frequencies of vibration of stylus 204 or a housing of computer 110.

FIG. 3 depicts two illustrative visual embodiments for providing pressure feedback to a user, but there are many other ways to provide this information. Referring again to the first moment in time in graph 301, the value of pressure magnitude 312 is relayed to computer 110, which may display a cursor 313 at a location corresponding to the point of contact of stylus 204 on the display. Here, the point of arrow 317 is surrounded by cursor halo 314, the shape and/or size (e.g., diameter) of which is dependent upon the current amount pressure being applied. Alternatively, computer 110 may retain the appearance of a cursor 315, and instead modify the appearance of an underlying displayed control 316, which is exemplified here as a button. It should be noted that cursors may vary, and can include hourglasses, pinwheels, insertion points, and so forth. In addition, a host of underlying displayed elements can be placed under the cursor and be similarly modified.

Moving rightward across FIG. 3, at a second moment in time in graph 301, stylus 204 further depresses digitizer 203 at point 321, which is recorded as pressure magnitude 322. Point 321 may be in the same location on digitizer 203 as point 311 or a different location. In the first visual feedback example, cursor halo 324 expands or otherwise changes size and/or shape to indicate the higher pressure to the user. Alternatively, in the second visual feedback example, the color of the button 326 darkens (or otherwise changes its appearance) noticeably in response to varying levels of applied pressure. At a third moment in time, digitizer 203 at point 331 is further depressed, registering as pressure magnitude 332. Again, point 331 may be the same location as points 311 and/or 321, or may be a different location, as will be discussed further. In response to the increased pressure, cursor halo 334 expands further to reflect the increase in pressure, or, in the second example, feedback button 336 darkens considerably. At a fourth and final moment in time, stylus 204 is beginning to lift away from digitizer 203 at point 341, which registers as pressure magnitude 342. In response to the decreasing pressure, cursor halo 344 begins to deflate in size, or, in the second example, button 346 begins to lighten in color or otherwise alter its appearance in a manner different from when the pressure was increasing. Again, point 341 may be the same location as points 311, 321, and/or 331, or may be in a different location.

The use of pressure feedback may not be desirable if and when computer 110 is not presently using the pressure information. For example, a first application may utilize pressure information but a second application may not. Thus, where the first application is being executed and/or is in focus, pressure feedback may be provided. However, where the second application is being executed and/or is in focus, then pressure feedback may not be provided. As such, conventional cursors and controls may be used both when pressure is and is not relevant. Feedback, such as the inclusion of a halo around a cursor, may therefore not only provide information on the current level of pressure being applied, but may also relay the fact that pressure is presently relevant. By viewing a cursor halo, or a color varying control, the user may be informed that additional input can be provided through the use of pressure. This selective providing of pressure feedback may allow controllable pressure input to be an easily-discoverable feature even for an amateur user, through simple trial and error.

Calibration may be an integral part of pressure sensitive input. Differing digitizers may translate force differently. As such, an operating system or application which allows for the use of pressure input may provide a calibration routine or pressure settings dialog. This may assist in standardizing input from various types of hardware. Additionally, it may allow weak or disabled individuals to vary the sensitivity of pressure measurements to accommodate their strength.

Although illustrative embodiments of the use of pressure are set forth in some detail below, other embodiments are available. For example, pressure information may be used to distinguish between which window receives an input. A softer contact may indicate a normal input to the current window, whereas a harder contact may be directed to another application, such as a media player playing in the background. Enabling such uses of pressure enable a power user to work more efficiently by providing a larger input "vocabulary" without needlessly complicating the interface. At the same time, average users who opt not to use pressure or users of devices without pressure sensitivity will not see their experience degrade. These embodiments only enhance the device interaction for those wishing to use them.

Additional forms of data related to contact with an input device are possible input modifiers. For example, an input device may detect the surface area of contact, the temperature at the point of contact, or dampness at the point of contact. Each may be used to supplement an input and control device behavior.

For each of the illustrative embodiments set forth below, a device receiving pressure information uses that information to augment the input it receives. This information can be used in a wide variety of ways, including pressure-sensitive controls, pressure-sensitive selection, and through the use of a variable-pressure tap, as will be discussed in detail.

Pressure-Sensitive Controls

Controls in a graphical user interface present intuitive input metaphors that allow users to manipulate and maneuver through data. Such controls are common elements found in graphical computer operating systems, individual applications, and other forms of software. Examples of known controls include, but are not limited to, scrollbars, spinner controls, resize handles, checkboxes, pull down menus, and buttons. In accordance with aspects of the present invention, controls may be augmented through the use of pressure data, providing users with an additional way to interact with displayed controls. For example, by making controls pressure-sensitive, users may be presented with a more manipulable user interface that responds faster and more accurately to their commands and that may more closely operate in accordance with the user's intent. Value-based controls, i.e., controls that manipulate an underlying numeric, alphabetic, or alphanumeric value, may be better served by allowing them to be pressure-sensitive. As another example, repeating controls, i.e., controls that repeat the same action when continuously selected, may also be better served by the addition of pressure sensitivity. A few examples of pressure sensitive controls are set forth below.

Figure 4:
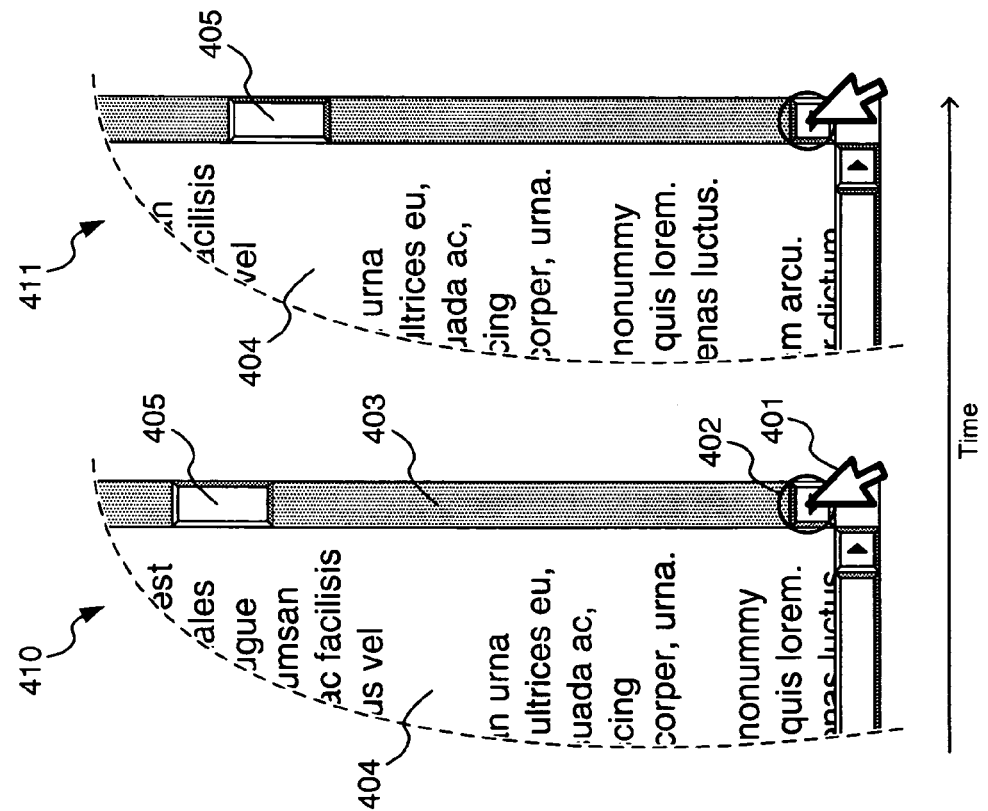
FIG. 4 illustrates movement of a scrollbar provided by an illustrative embodiment of the invention.

FIG. 4 illustrates movement of a vertical scrollbar 403 provided by an illustrative embodiment of the invention. Scrollbar 403 graphically displays and updates an underlying index value indicating a current position within a corresponding document 404. FIG. 4 is divided into two arbitrary "frames" 410, 411 for explanatory purposes only. The frames 410, 411 show the same displayed graphical user interface as it changes over time, starting with portion 410 and ending with portion 411. In first frame portion 410 of FIG. 4, a cursor 401, with a cursor halo 402, indicates that the user is presently activating the down arrow button of vertical scrollbar 403. Scrollbar 403 indicates the vertical placement of document 404 according to the vertical location of a thumb control 405. The size of cursor halo 402 signifies a relatively small amount of pressure being applied. After a period of time, in second frame 411, the user has continued to activate the down arrow button, and the displayed portion of document 404 has scrolled down (which is actually implemented by moving document 404 up), as indicated by the new location of thumb control 405. Because of the small amount pressure applied by the user, the computer scrolls scrollbar 403 relatively slowly.

Figure 5:
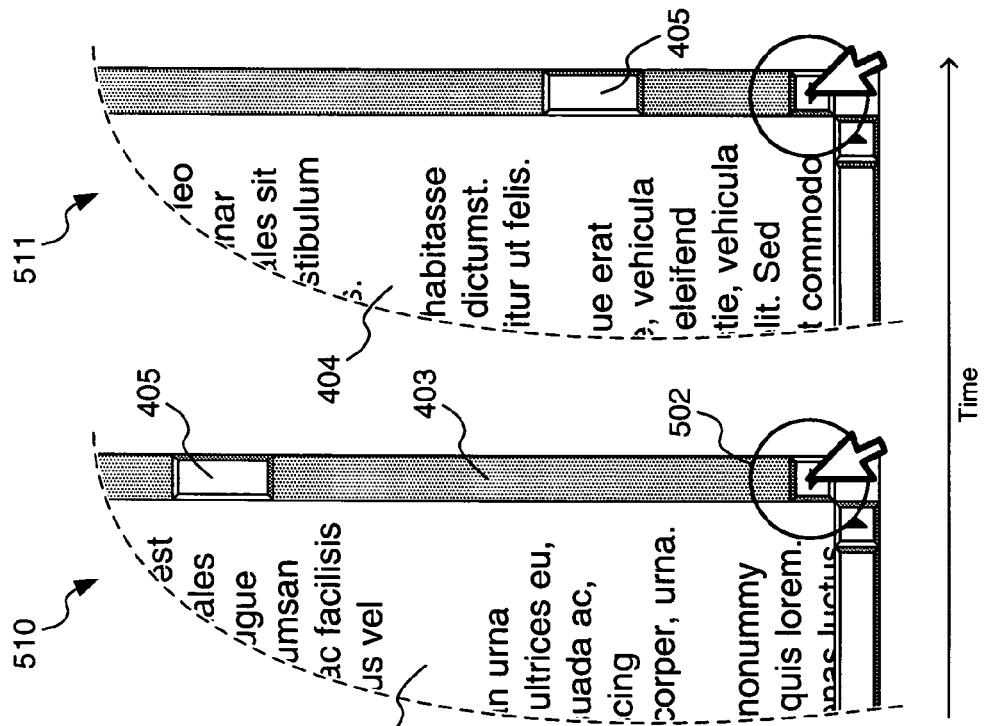
FIG. 5 illustrates movement of a scrollbar provided by an illustrative embodiment of the invention.

FIG. 5 illustrates the same embodiment depicted in FIG. 4, and like FIG. 4 is also divided into two time-lapsed frames 510, 511, where the amount of time that passes between frames 510 and 511 is the same as the amount of time that passes between frames 410 and 411. Here, in first frame 510, scrollbar 403 is at the same starting point as in frame 410, but this time, the user is pressing harder with stylus 204, as indicated by a larger cursor halo 502. As a result, in second frame 511, thumb control 405 indicates that the displayed portion of document 404 has scrolled down further than it did in FIG. 4. Because of the greater amount of pressure applied by the user when activating the down arrow button, computer 110 scrolls scrollbar 403 faster. Thus, in the presented embodiment, the scrolling speed of scrollbar 403 is dependent upon the amount of pressure applied to the down arrow button of scrollbar 403. The same may apply to the up arrow button of scrollbar 403, as well as the left and right arrow buttons of a horizontal scrollbar. The scrolling speed of scrollbar 403 may have any relationship to the applied pressure, such as a linear relationship or a nonlinear relationship.

FIG. 6 illustrates incrementing a spinner control 601 provided by an illustrative embodiment of the invention. Spinner control 601 has an entry field 602, where a user can view or change a numeric value, and up arrow button 603 and down arrow button 604, the selection of which respectively increments or decrements the value in the entry field. As in FIGS. 4 and 5, FIG. 6 is also divided into frames 610, 611, 612, which show the same graphical user interface changing over time from left to right in that figure. In first frame 610, entry field 602 contains an initial value 0. Once a user activates up arrow button 603, the value in entry field 602 begins to increment. In second frame 611, this activation is indicated by arrow cursor 605 with cursor halo 606. As indicated by the size of cursor halo 606, light pressure is being used to manipulate the control, and as such, the value in entry field 602 has increased at a rate and/or increment (e.g., incrementing by 1) that depends upon the applied pressure. In third frame 612, the increase continues at a rate and/or increment that depend upon the applied pressure. In FIG. 6, it is assumed that the same amount of time has elapsed between frame 610 and 611 as between frames 611 and 612, and for simplicity that the applied pressure has remained constant throughout frames 610-612.

FIG. 7 illustrates the same embodiment depicted in FIG. 6, and like FIG. 6 is also divided into three time-lapsed frames 710, 711, 712, where the amount of time that passes between frames 710 and 711 is the same as the amount of time that passes between frames 610 and 611, and the amount of time that passes between frames 711 and 712 is the same as the amount of time that passes between frames 611 and 612. In first frame 710, spinner control 601 has been reset to the same initial value as in frame 610. However, in second frame 711, when greater pressure is applied to activate up arrow button 603, the value in entry field 602 is updated using a larger increment and/or at a greater rate than in FIG. 6. The higher pressure is indicated by the larger cursor halo 706. In third and final frame 712, the higher pressure continues updating the value using the larger increment and/or at a greater rate. Thus, the value of a spinner control may increase or decrease by an increment and/or at a rate that depends linearly or nonlinearly upon the applied pressure.

Additionally or alternatively, with value-based controls, such as the spinner and scrollbar controls, pressure sensitivity may be used to control the rate of adjustment of a value or index. Although in the above examples, the pressure applied remained constant, that does not need to be the case. Indeed, a user may continuously and dynamically increase and decrease the pressure applied when providing an input in order to affect the operation of the control. As the pressure changes, so does the affect on the control, such as the rate of change. Moreover, the value need not be numeric, and could be chosen from any defined set, such as a set of characters, words, colors, patterns, and so forth, depending on the particular need. For example, a color selection can be made by using pressure to speed and slow the rate of change among a selection of colors and/or to control the intensity or other property of a color. Another embodiment may involve selecting a state in a pull down menu and using pressure to speed and slow the movement of the list.

Figure 8:
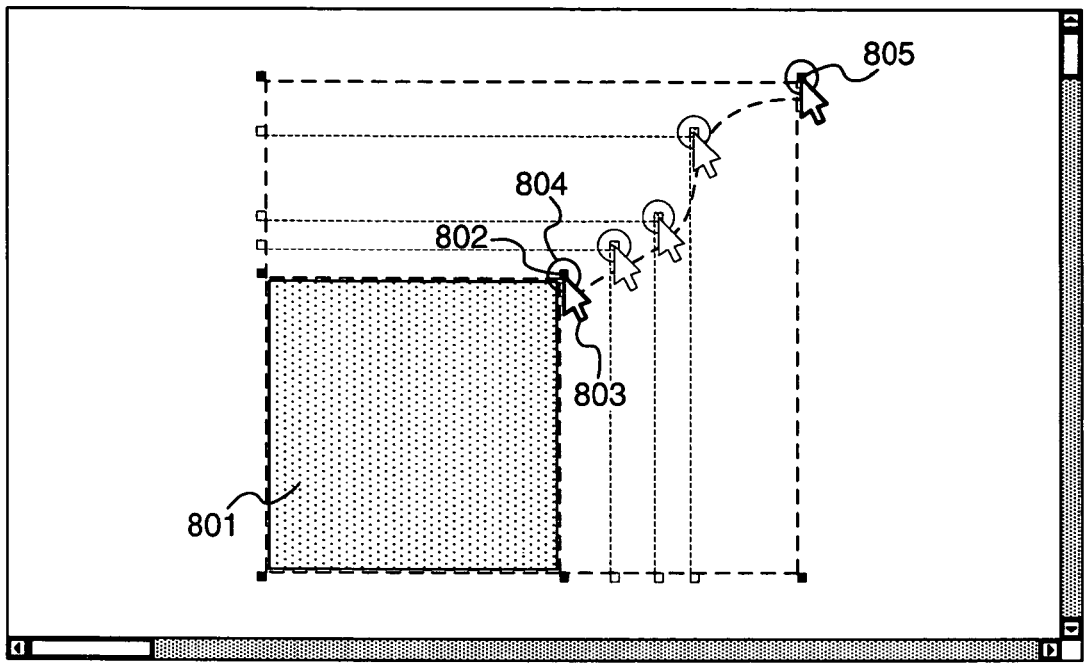
FIG. 8 illustrates resizing of an object in a manner provided by an illustrative embodiment of the invention.
Figure 9:
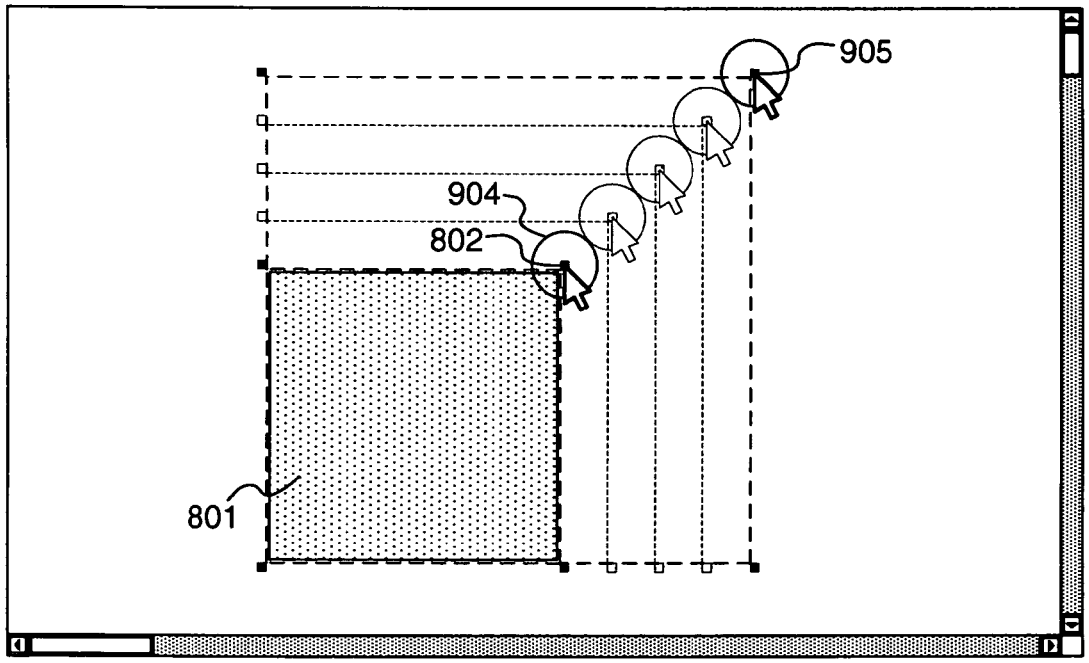
FIG. 9 illustrates resizing of an object in a manner provided by an illustrative embodiment of the invention.

Pressure sensitivity may further be used to constrain the change of a value, as depicted for example in FIGS. 8 and 9. FIG. 8 illustrates resizing a drawing object 801 using an illustrative embodiment of the invention. The context here may be a drawing application or other program that allows users to resize objects. In FIG. 8, drawing object 801 is being resized by a user. Arrow cursor 803 having cursor halo 804 is positioned over resize handle 802 at one corner of object 801. Light pressure is applied by the user, as indicated by the small cursor halo 804. As such, the application allows the user to resize following a smooth, freeform path. At the end of the path, resize handle 802 has been repositioned at location 805.

FIG. 9 illustrates the same embodiment of the invention depicted in FIG. 8. The difference here is that the user is applying more pressure, as indicated by larger cursor halo

904. Because of this greater pressure, the application may cause the movement of resize handle 802 to be non-smooth, such as by constraining it to fixed positions on a predetermined grid, for example. Here, resize handle 802 is relocated at location 905. Along the way, resize handle 802 is limited to locations along a fixed grid, which may or may not be visible to the user. Alternatively, the amount of pressure applied may affect the grid increment by which object 801 can be resized. In addition, an operating system or application may reverse the relationship, and constrain resize movement to a grid when less pressure is applied and allowing freeform resizing only when more pressure is applied.

The pressure-sensitive control (i.e., resize handle 802) disclosed in FIGS. 8 and 9 is not necessarily limited to resizing objects. It may apply to other controls such as for moving objects, for example. It may also be used for resizing or repositioning windows in an operating system or application. Ultimately, the technique can be used in any instance where values defining an object's screen position, shape, size, and/or any other property are being modified. Furthermore, other forms of pressure-sensitive controls may be implemented. For example, a button or other control that performs an action when activated and that repeats the action when continuously activated may be pressure-sensitive. Such a repeating control may repeat the action faster when greater pressure is applied to the input, and likewise slow down the rate of repetition when less pressure is applied. An additional implementation involves the use of harder pressure to vary the behavior of a drag operation. For example, dragging a drawing object while pressing harder may cause the object to paste in repeated fashion, similar to a rubber stamp effect; the harder the drag, the more frequent the repeating stamps.

Figure 10:
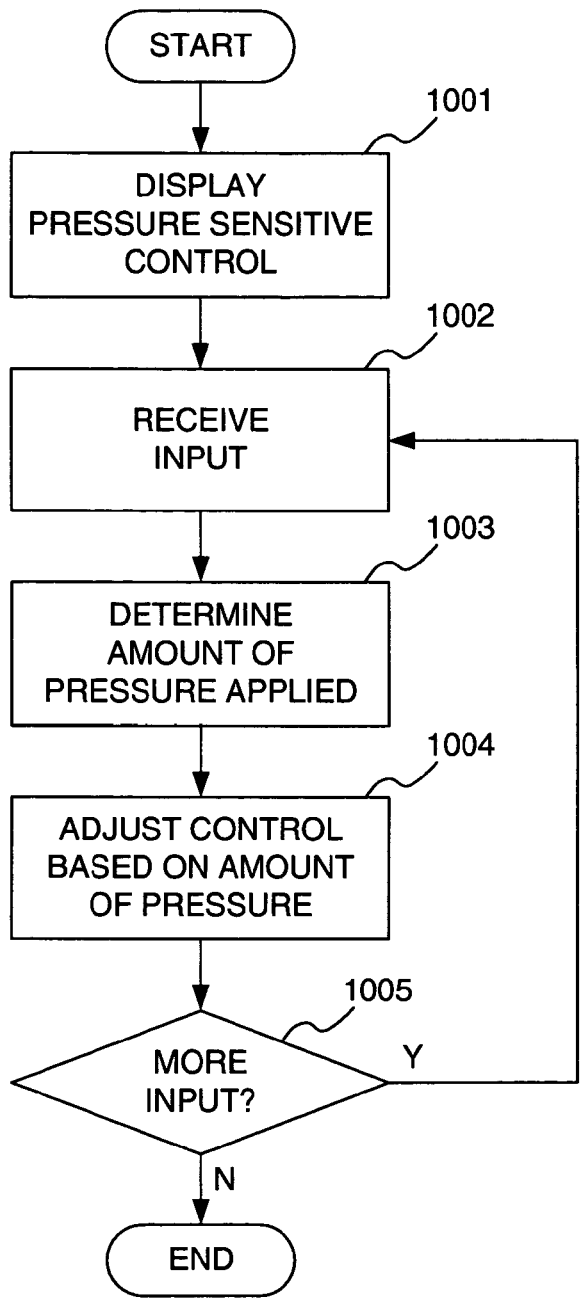
FIG. 10 is a flowchart for a method for adjusting a displayed control provided by an illustrative embodiment of the invention.

FIG. 10 illustrates a method for adjusting a displayed control provided by an illustrative embodiment of the invention. In step 1001, computer 110 displays a pressure sensitive control on display 202, for example a scrollbar, resize handle, button, spinner control, and so forth. When a user directs input to the control, coupled with pressure applied by the user with stylus 204, computer 110 receives the input, as in step 1002. At step 1003, computer 110 determines the amount of pressure applied by the user. Alternatively, computer 110 may, at this point, compare the pressure applied to an amount applied previously in order to determine its relative magnitude. At step 1004, computer 110 moves or modifies the respective control (including adjusting any underlying value) in accordance with the amount of pressure applied. A greater amount of pressure from the user may cause adjustments to the control carried out in a first manner, perhaps by speeding up or using larger increments, whereas less pressure may cause adjustments to occur in a second manner, such as slower adjustments, or even cause the control to behave as if not pressure-sensitive. At decision 1005, computer 110 determines whether the user input continues, and if so, performs steps 1002-1005 again. Otherwise, the method terminates and/or awaits another user input.

Pressure Based Selection

Item selection is a common activity for users of graphical computer operating systems, applications, and other software, and activity that can benefit from pressure sensitivity. Selecting choices from a list, words in a document, files in a folder, etc. are tasks with which most users are familiar. Pressure sensitivity enhances the process of item selection, for example when the use of double or triple mouse clicks are needed to broaden a selection but no mouse is available, such as with a tablet computer. For example, by pressing harder, a user signals that he wants to select a larger number of items. A user need not attempt a notoriously difficult double or triple click with a stylus on a tablet computer.

Figure 11:
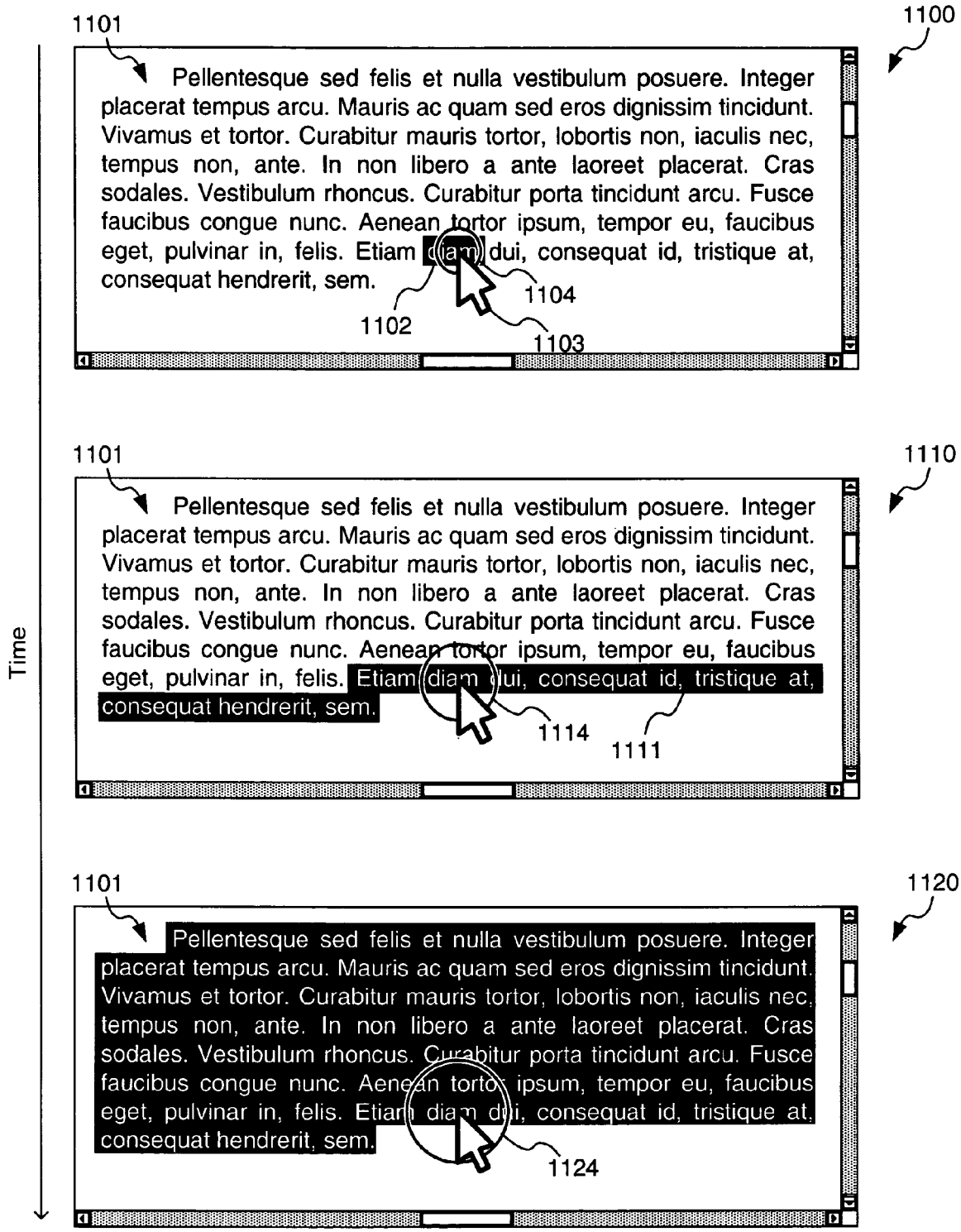
FIG. 11 illustrates selecting text in a manner provided by an illustrative embodiment of the invention.

FIG. 11 illustrates selecting text in a word processing application in a manner provided by an illustrative embodiment of the invention. As in several of the previous figures, FIG. 11 is divided into three frames 1100, 1110, 1120. Frames 1100, 1110, and 1120 illustrate how a graphical user interface may react to different applied pressures. In first frame 1100, a word 1102 in paragraph 1101 is being selected by cursor 1103 having cursor halo 1104. A user applies a small amount of pressure to select word 1101. Alternatively, with a small amount of pressure, the user may simply place an insertion point in the middle of word 1102. As the user presses harder, she begins to select more text, as shown in second frame 1110, wherein more of paragraph 1101, such as a line or sentence, is selected in the form of sentence 1111. The greater pressure is reflected as visual feedback in the form of larger cursor halo 1114. In third frame 1120, the user presses harder still, reflected in larger cursor halo 1124, which selects the entire paragraph 1101. Alternatively, pressing even harder may select a whole document or document section. Conversely, decreasing the selection pressure may deselect a paragraph and select only a word or sentence again. Thus, different levels of applied pressure on a displayed document may cause different amounts of the document to be selected.

Figure 12:
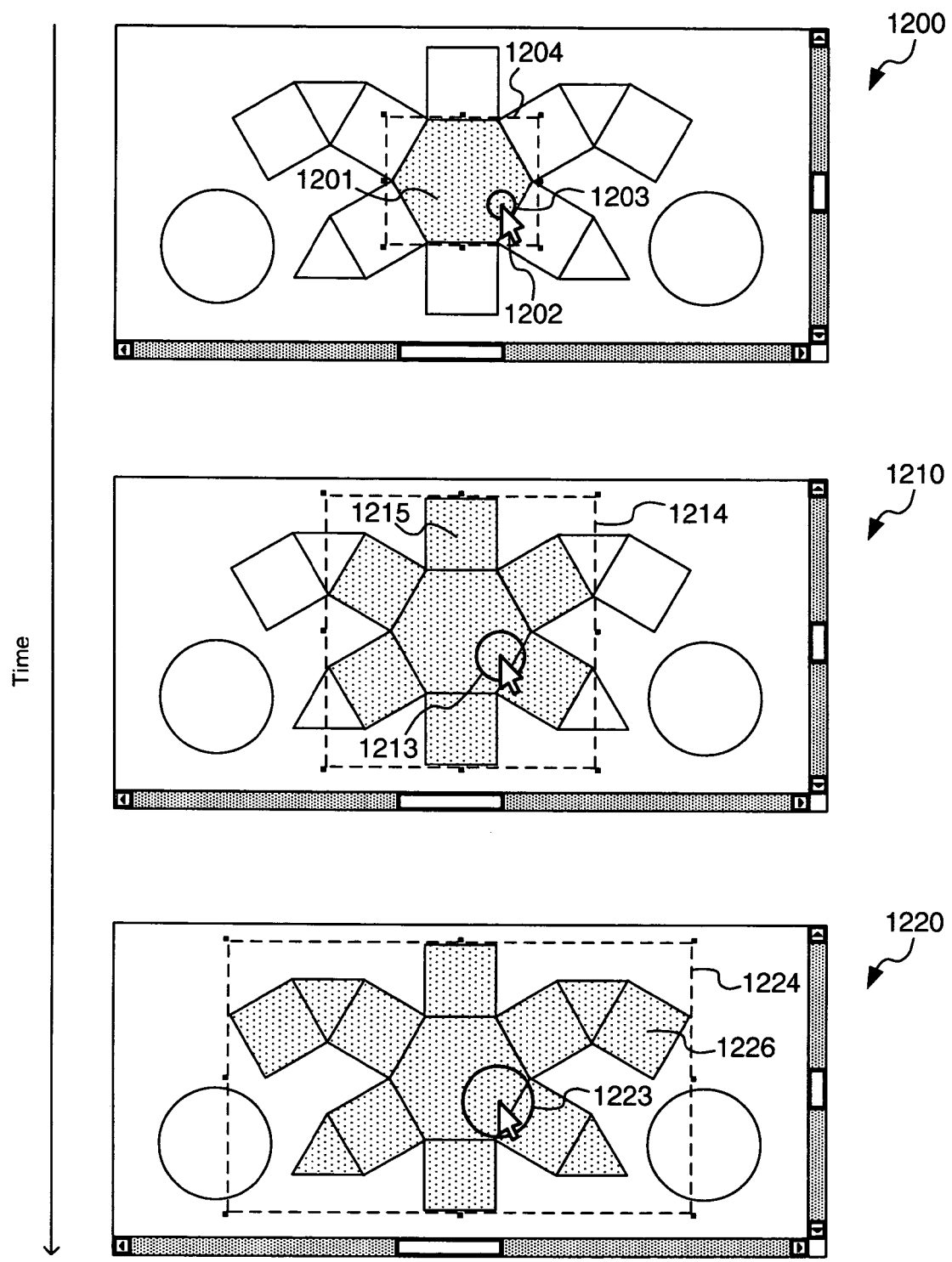
FIG. 12 illustrates selecting drawing objects in a manner provided by an illustrative embodiment of the invention.

FIG. 12 illustrates selecting drawing objects in a drawing software program in a manner provided by an illustrative embodiment of the invention. As in FIG. 11, FIG. 12 is divided into three frames 1200, 1210, 1220 that illustrate how a graphical user interface may react to different applied pressures. In first frame 1200, drawing object 1201 is selected by a user using a small amount of pressure, as indicated by cursor 1202 having a small cursor halo 1203. Selected object 1201 may be surrounded by a selection tool embodied as a selection border 1204. Each drawing object within the selection border 1204 is part of the selection. In this example, the size of the selection border 1204 (i.e., the area encompassed by the selection border 1204) depends upon the amount of applied pressure. As indicated by the size of cursor halo 1203, the user is pressing lightly in order to select the object currently under cursor 1202. As the user presses harder, in second frame 1210, selection border 1204 grows in accordance with the higher applied pressure, and in this case grows sufficiently large so as to encompass more objects, including, for example, object 1215. Cursor halo 1213 reflects the increasing pressure applied by the user. As the user presses harder still, in third and final frame 1220, selection border 1204 grows larger still, encompassing more drawing objects in this case including, for example, object 1226. Selection border 1204 may be constrained to grow to encompass only objects connected or adjacent to the originally-selected object, or may be configured to also encompass objects not connected or adjacent to the originally-selected object. As before, reducing the pressure applied may return the selection to a smaller number of objects.

Alternative forms of item selection are known which may be enhanced through the use of pressure based selection. For example, U.S. Patent Application Publication No. 20040021701 A1, entitled "Freeform Encounter Selection Tool," which is hereby incorporated by reference as to its disclosure of an encounter selection tool, discloses a freeform encounter selection tool for a computer system with a graphical user interface that allows a user to draw a freeform selection path so as to select one or more items along or near the path. As the user drags a pointing device such as a stylus or a mouse, a freeform selection path is created so that the encounter selection tool selects graphical items that are encountered.

Figure 13:
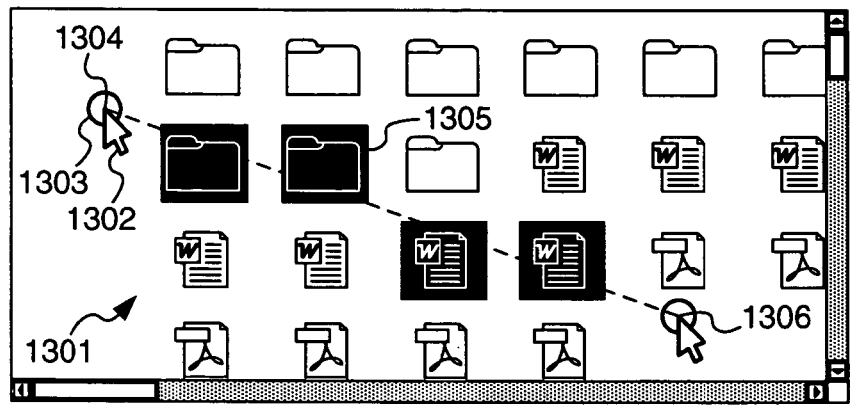
FIG. 13 illustrates using encounter selection to select file and folder objects in a manner provided by an illustrative embodiment of the invention.

FIG. 13 illustrates using an encounter selection tool to select file and folder objects by an illustrative embodiment of the invention. Here, a subset of a collection 1301 of files and folders is selected by dragging cursor 1302, having cursor halo 1303, from start point 1304 to end point 1306. Folders and files encountered along the path of the cursor, for example folder 1305, are selected and highlighted as shown. The user may then perform a common function among all of the files, such as throwing them away. As can be seen from the cursor halo, the user is only pressing lightly when he uses the encounter select tool. This leads to a relatively narrow selection path. In this embodiment, the lighter the pressure, the narrower the selection path, and thus in general the fewer the number of objects selected along the selection path.

Figure 14:
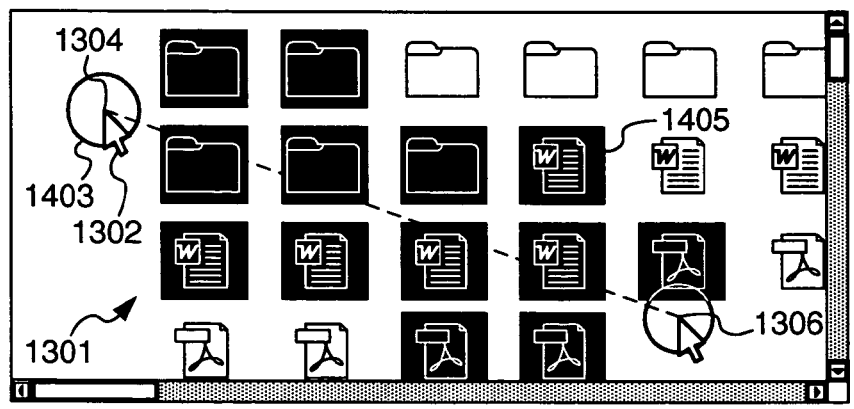
FIG. 14 illustrates using an encounter selection to select file and folder objects in a manner provided by an illustrative embodiment of the invention.

FIG. 14 illustrates the same collection 1301 of files and folders presented in FIG. 13. Here, however, the user presses harder while moving cursor 1302 from start point 1304 to end point 1306, as reflected in larger cursor halo 1403. The result of the increased pressure is that a wider selection path is created and a larger number of objects is selected, including, for example, document 1405. Although this embodiment has been discussed with regard to a freeform selection path that follows movement of the cursor 1306, the selection path may take other forms such as a linear path that extends between the start point 1304 and the end point 1306, regardless of the path the cursor 1306 takes between the start and end points 1304, 1306.

Figure 15:
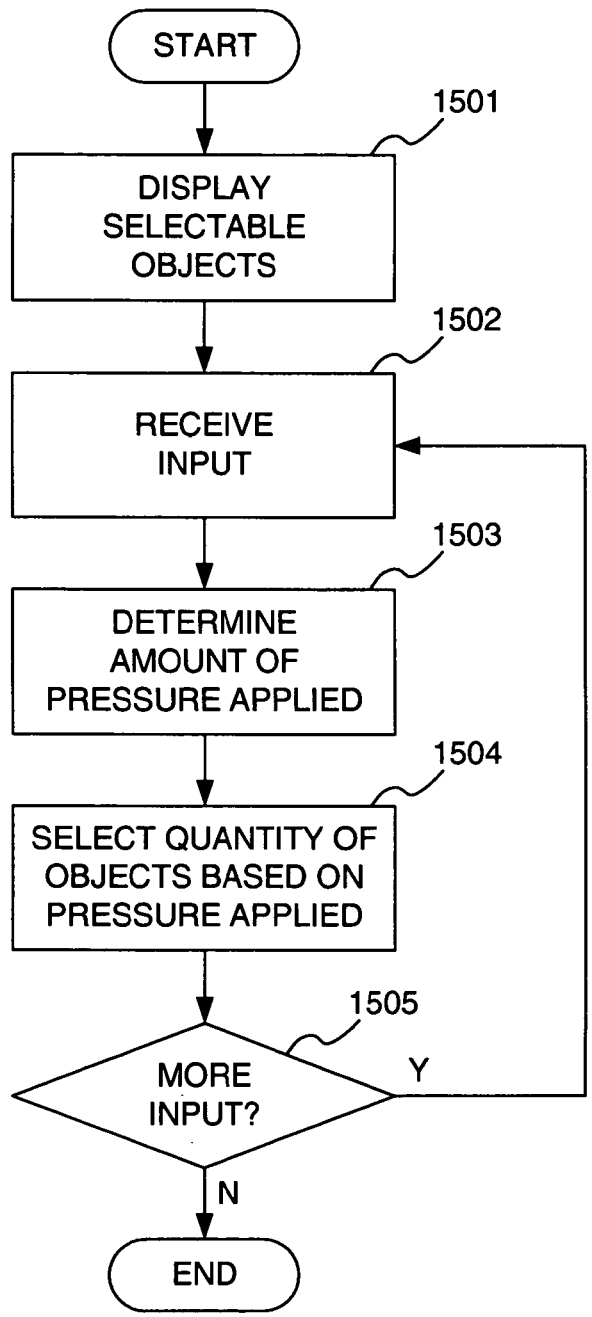
FIG. 15 is a flowchart for a method for selecting displayed objects provided by an illustrative embodiment of the invention.

FIG. 15 illustrates one method for selecting displayed objects provided by an illustrative embodiment of the invention. In step 1501, a collection of selectable items such as characters, drawing objects, file icons, etc. is displayed. A user then selects at least one of the items with stylus 204, and the stylus input is received in step 1502. At step 1503, the amount of pressure applied by the user with the stylus 204 is determined so that, in step 1504, the identities of which items are selected can be modified. For example, when a user presses harder during a selection operation, the selection path widens, and so more of the items may be selected. If there is more input from the user, at decision 1505, the steps continue. Otherwise, the method terminates normally or awaits further user input.

The pressure-based selection embodiments presented above are only representative, and other forms of selection may be enhanced through the inclusion of pressure information. For example, a lasso selection tool, which is familiar from its use in graphics editing software, may be enhanced with pressure information. In such software, lasso selection allows a user to encircle in freeform fashion a graphic of interest and cut or copy it. A user, by pressing harder while encircling a selected graphic of interest, may control the amount of feathering used to soften the edges of the graphic of interest when it is cut or copied, or whether to select objects only partially within the lasso (e.g., lower pressure does not select such objects while higher pressure does select such objects). Additionally, pressure based selection may allow for a selection zoom. For example, while pressing harder on a pixel to select it, the screen may zoom in further allowing greater detail to be displayed. The user can then achieve more precision while selecting neighboring pixels.

Hard Tap

Tapping a digitizer is a common form of user interaction with a computing device, such as a tablet computer, which can be enhanced by exploiting pressure information available from the digitizer. The term tap includes the contact and removal of a stylus, such as a pen, finger, or any other pointing implement, with the surface of the digitizer. Typically, a tap is interpreted as equivalent to a mouse click, regardless of how much force was used to impact the digitizer. Pressure information can be used, however, to distinguish normal taps from hard taps, enabling new sources of user input. For example, a tap with an applied pressure within a given first pressure range may be considered a normal tap, whereas a tap with an applied pressure within a given higher second pressure range may be considered a hard tap. Any number of pressure ranges may be defined with an associated tap type. A normal tap may, for example, be interpreted as a simple click, and a hard tap may, for example, be used to trigger additional functionality. For example, a hard tap may be interpreted as a double-tap (notoriously difficult on digitizer displays), or as a right click, or as a trigger for an on-screen keyboard for tapping out words and sentences, or as a request to launch an application, or as a middle click (on a three button mouse), or as a scroll wheel click, and so forth.

FIGS. 16 and 17 illustrate one embodiment of hard taps. As in some previous figures, FIGS. 16 and 17 are each divided into two arbitrary frames 1610, 1611, 1710, 1711 that show how a displayed graphical user interface is affected by different types of taps. FIG. 16 depicts movement of a scrollbar under conditions of a normal tap provided by an illustrative embodiment of the invention. Here, in first frame 1610, a user taps on scrollbar 1603, the tap being indicated by the temporary placement of cursor 1601 and starburst halo 1602. The starburst halo 1602 may signify to the user that a tap is being received as opposed to a press-and-hold. The small starburst halo 1602 indicates, in this case, that the tap was not very hard. In second frame 1611, the results of the tap are viewable. Document 1604 has scrolled down one page, and the thumb control 1605 has shifted down.

First frame 1710 of FIG. 17 illustrates the same starting position of document 1604 and thumb control 1605. A user taps the same location on scrollbar 1603 as before, but this time taps harder. The starburst halo 1702 that temporarily appears is larger, indicating that a harder tap was registered than in FIG. 16. Rather than page down as before, the hard tap in this case triggers a different function. As can be seen in second frame 1711, thumb control 1605 jumps directly to the location of the harder tap. This can be useful for a user who wants to go directly to a portion of document 1604 without waiting for the scrollbar to page down.

Figure 18:
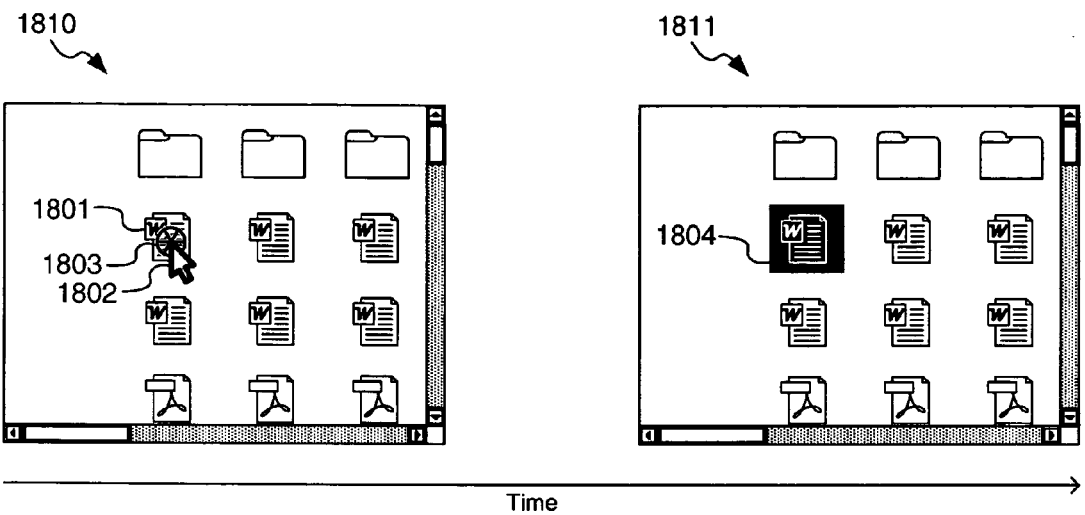
FIG. 18 illustrates selection of a file provided by an illustrative embodiment of the invention.
Figure 19:
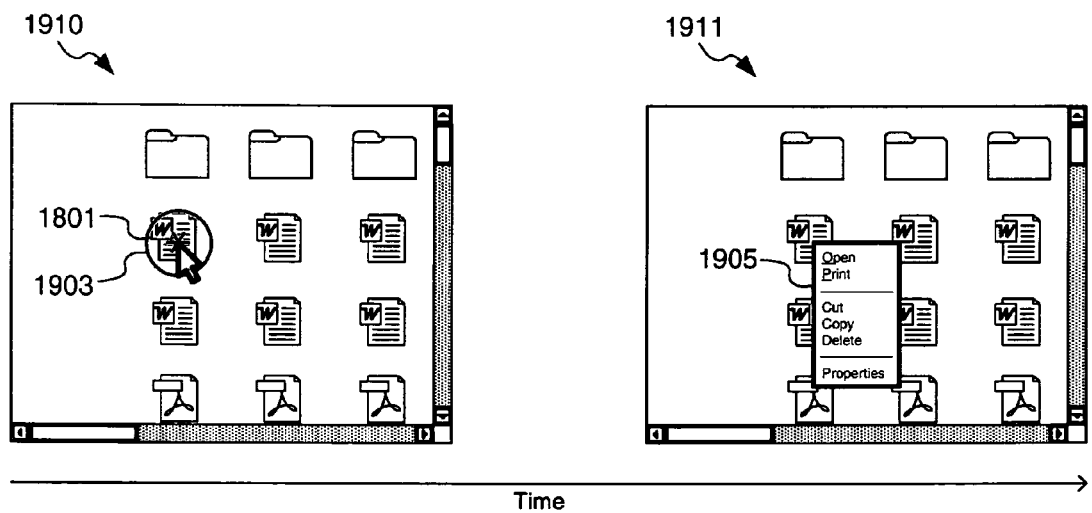
FIG. 19 illustrate displaying a context sensitive menu provided by an illustrative embodiment of the invention.

FIGS. 18 and 19 illustrate a second embodiment of hard and normal taps. As before, the figures are each divided into two arbitrary frames 1810, 1811, 1910, 1911 that show how the effect of different types of taps. In first frame 1810 of FIG. 18, a file 1801 receives a single normal tap, as signified by cursor 1802 with starburst halo 1803. As a result of the lower pressure applied, in second frame 1811, computer 110 interprets the normal tap as a left click and file 1804 is highlighted. The first frame 1910 of FIG. 19 differs from that of FIG. 18 in that file 1801 receives a hard tap, as signified by larger starburst halo 1903. As a result, computer 110 performs a separate action in second frame 1911, treating the hard tap as a right click, and displaying the context sensitive menu rather than selecting the file.

As stated, the variable-pressure tap embodiments described above are only a few of the uses of such an enhancement. In addition, there are many embodiments for providing feedback about the type of tap being received. The starburst halo described above is merely demonstrative. For example, other forms of visual feedback include changing the color or transparency of the point of impact rather than changing the cursor. In addition, audio feedback may distinguish a hard tap from another tap or input. The existence of a particular sound, or the volume of a sound, or a particular pitch may provide the feedback needed by a user to distinguish tap types. The methods for evaluating a hard tap and distinguishing hard taps from other forms of input are set forth in some detail below.

Figure 20:
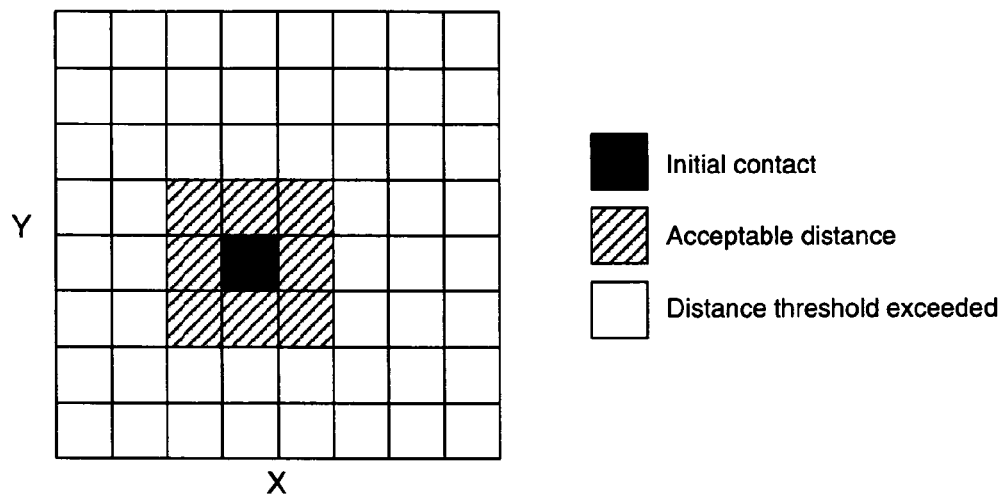
FIG. 20 depicts a distance threshold for determining a type of tap provided by an illustrative embodiment of the invention.

Distinguishing a hard tap from other user inputs on a digitizer may involve determining whether the tip of stylus 204 maintains a substantially constant position on the surface of digitizer 203. A tap that moves across the surface of digitizer 203 is more likely an intended drag operation rather than a tap, and so a distance threshold may be used to ensure that the point of contact does not move too far. Such a threshold is depicted in FIG. 20, which provides an illustrative layout for a distance threshold on an X-Y coordinate plane defining locations on the surface of digitizer 203. Here, the initial point of contact is represented by the black unit square in the middle of the figure. Unit squares in FIG. 18 are shaded for explanatory purposes only, and are not necessarily displayed as shown, if at all, to the user. Each unit square (or other shaped area) may represent a pixel on the underlying display and/or a minimum resolvable area that may be sensed by digitizer 203, or any other unit of area, whether arbitrary or whether defined in accordance with properties of display 202 and/or digitizer 203. The immediately adjacent squares or pixels (cross-hatched in FIG. 18) form a distance threshold. By way of example, stylus 204 may initially impact the pressure-sensitive surface of digitizer 203 at the black square, and stylus 204 may immediately thereafter slide just a little bit. However, if, over time, stylus 204 moves outside the distance threshold (i.e., in this example, moves outside the cross-hatched unit squares), then a hard tap is not registered by computer 110. This distance threshold is configurable. If a user has a difficult time holding a pointing implement steady, she may be able to adjust the distance threshold, such as by increasing the distance threshold to include a larger range of acceptable contact points.

Figure 21:
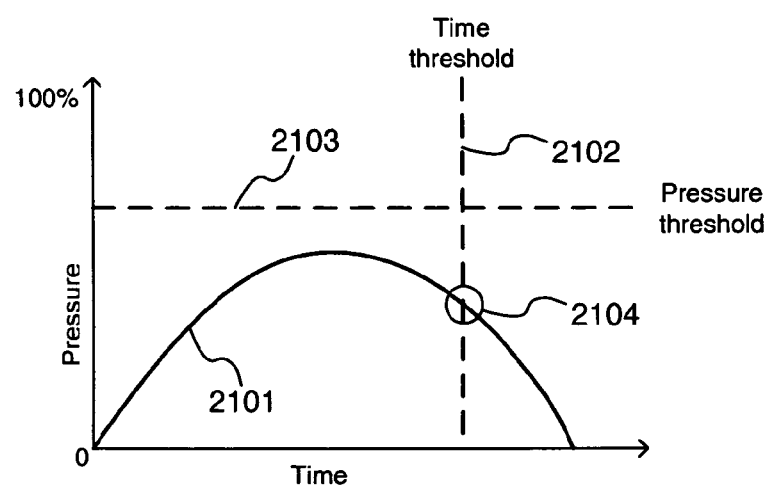
FIG. 21 depicts a graph of input pressure over time not resulting in a hard tap as provided by an illustrative embodiment of the invention.

If stylus 204 stays inside the distance threshold for an appropriate period of time, computer 110 still may not register a hard tap. In general, computer 110 may determine whether a tap input by stylus 204 is a hard tap depending upon applied pressure, hold time, and/or slide distance of stylus 204. In this example, for the tap to be a hard tap, the tap input must reach an appropriate pressure threshold within a particular time threshold. FIG. 21 depicts a graph 2101 of input pressure over time not resulting in a hard tap as provided by an illustrative embodiment of the invention. Here, the tap has stayed within the appropriate distance threshold, but by the time the contact passes time threshold 2102 (perhaps set at ¼ of a second or another amount of time) at point 2104, the magnitude of pressure has not passed pressure threshold 2103. As a result, computer 110 may interpret the input as a normal tap or some other type of input.

Figure 22:
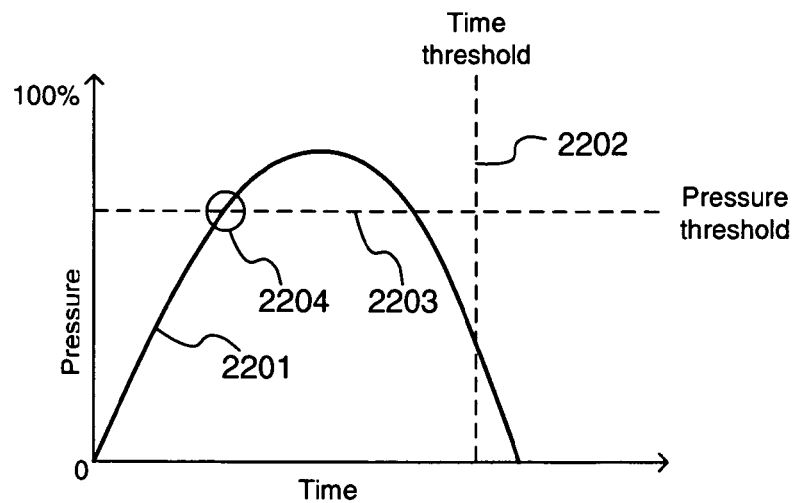
FIG. 22 depicts a graph of input pressure over time resulting in a hard tap as provided by an illustrative embodiment of the invention.

FIG. 22 depicts a graph 2201 of input pressure over time resulting in a hard tap as provided by an illustrative embodiment of the invention. Here, the contact being graphed has surpassed a pressure threshold 2203 at a point 2204 before reaching a time threshold 2202. This may therefore be registered as a hard tap, and the operating system or application can process it as such. If the operating system or application does not take advantage of hard taps, then the tap can be interpreted as a normal tap.

Figure 23:
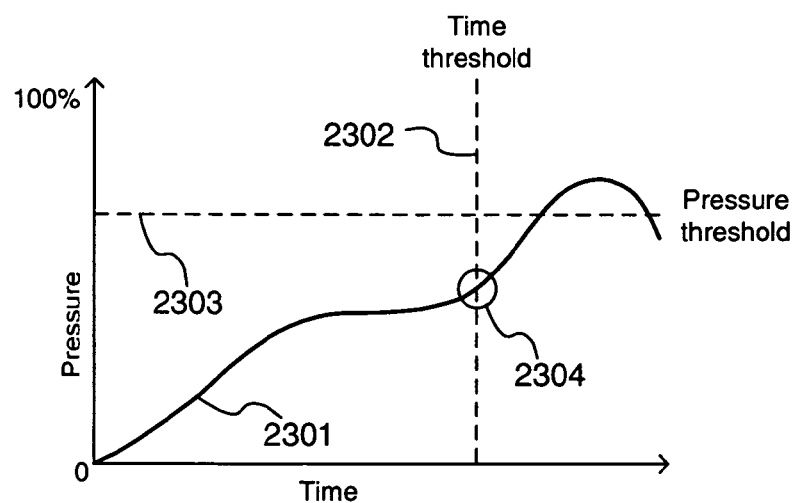
FIG. 23 depicts a graph of input pressure over time not resulting in a hard tap as provided by an illustrative embodiment of the invention.

As another example, FIG. 23 depicts a graph 2301 of input pressure over time in which the tap input does not register as a hard tap as provided by an illustrative embodiment of the invention. In this example, the contact with the surface of digitizer 203 eventually exceeds a pressure threshold 2303, but not within a time threshold 2302. When the time of contact exceeds time threshold 2302 at a point 2304, similar to the example in FIG. 21, the input can be passed on as something other than a hard tap, such as a normal tap.

It should be noted that the time and pressure thresholds used to detect a hard tap may be user- or software-configurable. Individual users can perfect their successful use of the hard tap by adjusting the pressure threshold and time threshold. For example, a particular user may not be able to achieve the pressure magnitude needed, and can adjust the pressure and/or time thresholds as desired, such as to adjust the pressure threshold lower to allow for "softer" hard taps. Pressure and/or time thresholds may further be automatically adjusted through a calibration routine. For example, computer 110, via a user interface, may request that the user execute what the user considers to be a normal tap as well as a hard tap. Computer 100 may measure the pressure and time properties of the user's input and automatically determine appropriate time and/or pressure thresholds in accordance with those properties.

Figure 24:
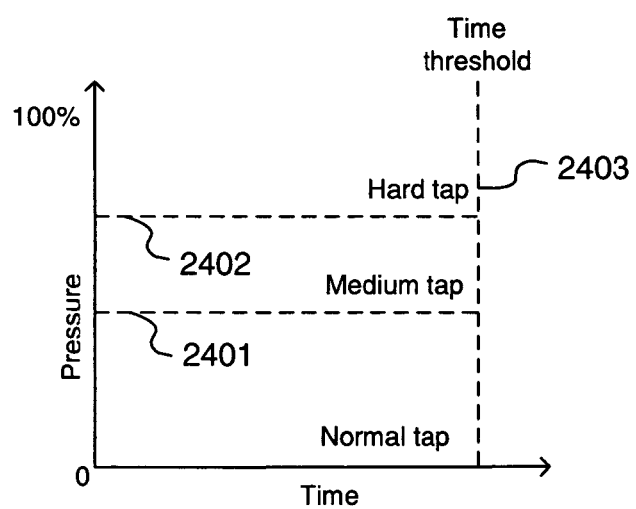
FIG. 24 depicts various input pressure thresholds over time for determining a type of tap as provided by an illustrative embodiment of the invention.

Alternative embodiments of the hard tap may allow for additional variations of the tap using multiple time, distance, and/or pressure thresholds. For example, FIG. 24 depicts a set of pressure ranges over time as provided by an illustrative embodiment of the invention. Here, taps not exceeding a pressure threshold 2401 within time threshold 2403 will be considered normal taps. Taps exceeding a pressure threshold 2401, but not exceeding a higher pressure threshold 2402 within time threshold 2403 will be interpreted as medium taps. And, taps exceeding pressure threshold 2402 will be interpreted as hard taps. Medium taps may be useful in some interface environments. Individual applications may provide different thresholds depending on their need, overriding thresholds set by the operating system.

Figure 25:
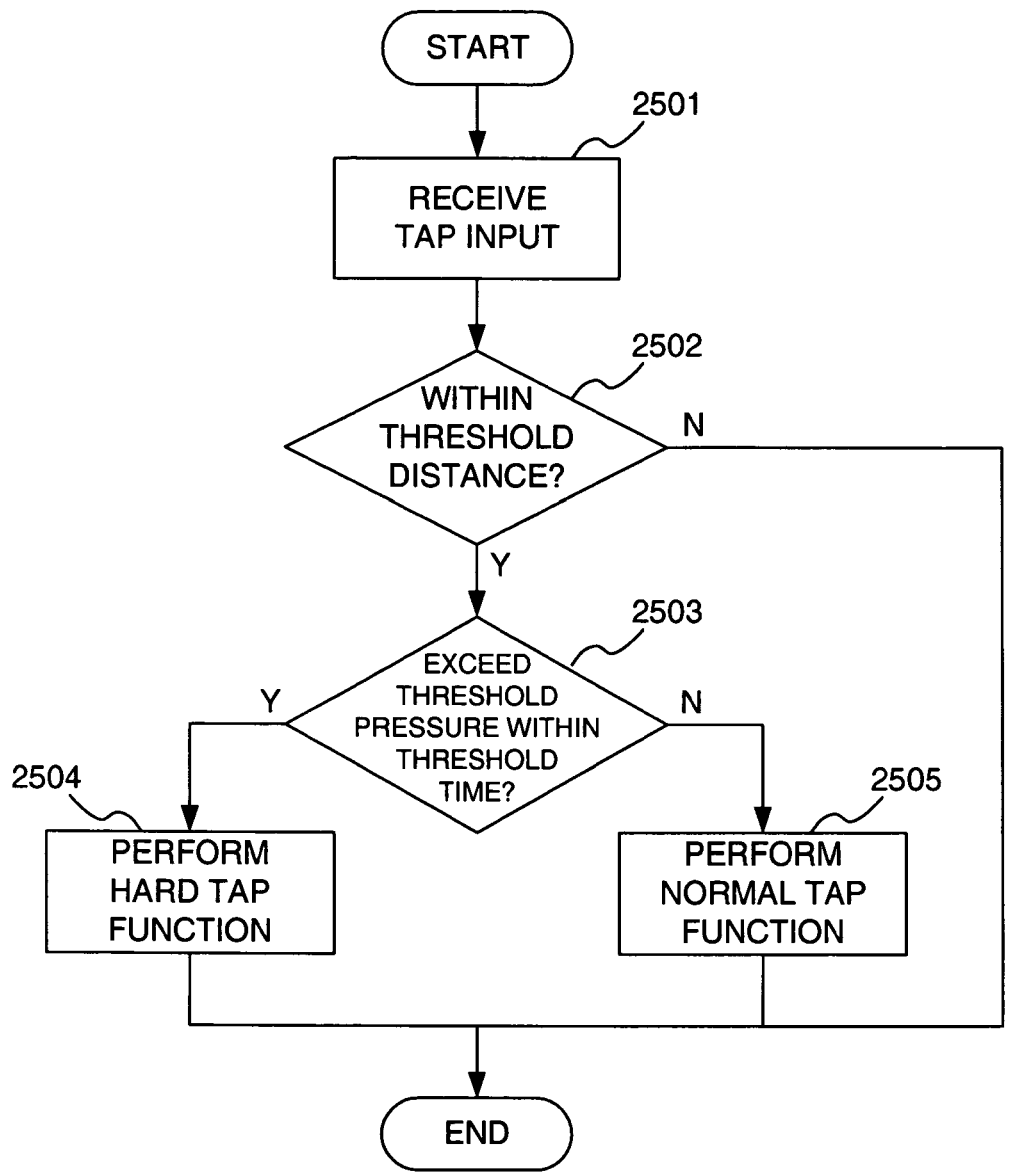
FIG. 25 is a flowchart for a method for responding to a user interaction provided by an illustrative embodiment of the invention.

FIG. 25 us a flowchart for a method for responding to a user interaction provided by an illustrative embodiment of the invention. In step 2501, computer 110 receives a stylus input upon digitizer 203, providing data about the tap including location and pressure over time. Given this information, at decision 2502, computer 110 determines whether the contact location has moved within a predetermined threshold distance from its initial point. If not, then no tap is found, as the input may be the beginning of a drag operation, or possibly handwriting. Alternatively, computer 110 may decide that such an input is a normal tap. If stylus 204 remains within the threshold distance during the input, then at decision 2503, computer 110 determines whether the applied pressure exceeds a predetermined threshold pressure within a predetermined time threshold. If not, then a normal tap is detected and the appropriate function is executed at step 2505. If the threshold pressure was reached within the time threshold, then a hard tap is detected and the appropriate function is executed at step 2504.

While the invention has been described with respect to specific examples including presently preferred modes of carrying out the invention, those skilled in the art will appreciate that there are numerous variations and permutations of the above described devices and techniques that fall within the spirit and scope of the invention as set forth in the appended claims. A claim element should not be interpreted as being in means-plus-function format unless the phrase "means for", "step for", or "steps for" is included in that element. Also, numerically-labeled steps in method claims are for labeling purposes only and should not be interpreted as requiring a particular ordering of steps.

We claim:

1. A computer-implemented method for selecting displayed items, the method comprising:
 receiving, at a computing device, an input upon a display surface of a display device as a user draws, over at least part of the display, a freeform selection path from a starting point to an ending point, the selection path effective to select interface items that the selection path encounters;

determining an amount of pressure applied by the input;

responsive to the amount of pressure being at a first level, assigning a first width to the selection path that causes the selection path to encounter a first number of selectable items that are depicted on the display within the selection path; and responsive to the amount of pressure being at a second level, greater than the first level, assigning a second width to the selection path, which is greater than the first width, that causes the selection path to encounter a second number of selectable items, which is greater than the first number, that are depicted on the display within the selection path.

2. The method of claim 1, wherein the method further includes running a calibration routine that allows a user to execute selection inputs of different levels of applied pressure and determining appropriate pressure thresholds to distinguish between different levels of applied pressure.

3. The method of claim 1, wherein the display device is a monitor with an integrated digitizer.

4. The method of claim 1, wherein the input is made by a human finger touching the display surface.

5. The method of claim 1, wherein the selectable items are digital pictures.

6. The method of claim 1, wherein the method further comprises:

responsive to the amount of pressure being at a third level greater than the first level and the second level, selecting a third number of selectable items within the selection path, wherein the third number is larger than the first number and the second number, and wherein the selection path has a third width that is greater than the first width and the second width.

7. The method of claim 1, wherein the selectable items are objects in a drawing application.

8. One or more computer-storage media having computer-executable instructions embodied thereon that when executed by a computing device performs operations for selecting displayed items, the operations comprising:

receiving, at the computing device, an input upon a display surface of a display device as a user draws, over at least part of the display, a freeform selection path for an encounter selection tool that selects interface items that the selection path encounters;

determining an amount of pressure applied by the input;

determining a level associated with the amount of pressure; and generating a selection path having a width that is sized based on the level of pressure and that causes a selection of selectable items that are encountered within the selection path.

9. The media of claim 8, wherein the operations further includes running a calibration routine that allows a user to execute selection inputs of different levels of applied pressure and determining appropriate pressure thresholds to distinguish between different levels of applied pressure.

10. The media of claim 8, wherein the display device is a monitor with an integrated digitizer.

11. The media of claim 8, wherein the input is made by a human finger touching the display surface.

12. The media of claim 8, wherein the selectable items are digital pictures.

13. The media of claim 8, wherein the selectable items are files.

14. A computing device, comprising:

a monitor that displays a graphical user interface that includes a plurality of objects;

a pressure sensitive input device that receives an input at an input pressure upon a surface, wherein the input is a two-dimensional path across a portion of the graphical user interface from a first point to a second point; and an encounter selection tool that selects objects within a free form encounter selection path running from the first point to the second point and having a width that changes based on an amount of the input pressure by increasing in the width in response to greater pressure.

15. The computing device of claim 14, wherein the computing device is one or more of a cell phone and personal digital assistant.

16. The computing device of claim 14, wherein the pressure sensitive input device is a digitizer.

17. The computing device of claim 16, wherein the digitizer is integrated into a the monitor of a touch screen display device.

18. The computing device of claim 14, wherein the input is made by a human finger touching the pressure sensitive input device.

19. The computing device of claim 14, wherein the computing device is tablet PC.

* * * * *